United States Patent

[11] 3,574,251

| [72] | Inventor | Marc A. Corti<br>Brookfield, Conn. |
|---|---|---|
| [21] | Appl. No. | 849,932 |
| [22] | Filed | Feb. 19, 1969 |
| [45] | Patented | Apr. 13, 1971 |
| [73] | Assignee | Marcoloy, Inc.<br>Stamford, Conn.<br>Continuation-in-part of application Ser. No. 628,515, Feb. 24, 1967, which is a continuation-in-part of application Ser. No. 379,530, July 1, 1964, now abandoned. |

[54] CUTTING TOOL
15 Claims, 16 Drawing Figs.

[52] U.S. Cl. .................................................. 29/105, 29/106, 51/247, 51/288
[51] Int. Cl. .................................................. B26d 1/12, B26d 1/00, B24b 19/00
[50] Field of Search ........................................ 29/95, 96, 97, 98, 105, 105.1, 103, 106; 77/58; 51/288, 225

[56] References Cited
UNITED STATES PATENTS

| 630,081 | 8/1899 | Brown ........................... | 29/105 |
| 960,526 | 6/1910 | Erlandsen ..................... | 29/106 |
| 1,225,552 | 5/1917 | Wnesthoff .................... | 29/105X |
| 1,348,279 | 8/1920 | Heywood ..................... | 29/105 |
| 1,834,972 | 12/1931 | Satterstrom ................. | 51/225 |
| 2,554,783 | 5/1951 | Lee ............................... | 29/106 |
| 2,645,003 | 7/1953 | Thompson .................... | 29/105 |
| 2,664,617 | 1/1954 | Kralowetz .................... | 29/105 |

FOREIGN PATENTS

| 551,843 | 11/1956 | Italy ............................. | 29/105 |

*Primary Examiner*—Harrison L. Hinson
*Attorney*—Nolte and Nolte

ABSTRACT: A cutterhead carries a plurality of cutting tools arranged in helical rows and disposed in separate recesses which preferably are round. A locking structure including a locking cup and screw is disposed in a separate round recess adjacent the recess in which the cutting tool is disposed and partly in communication with that recess at the cutter surface, whereby automatic alignment of these portions will be achieved upon insertion. The shank of each tool has a tapered portion which is inclined to the axis of the recess with the widest part of the tool being located at the bottom of the recess into which it is disposed. The locking cup also has a tapered wedge portion which engages the cutting tool wedge portion. When the locking screw is forced downwardly, it forces the locking cup's tapered surface against the corresponding juxtaposed cutting tool's tapered shank portion, thereby locking the cutting tool within its recess. Preferably the shanks are bored longitudinally so that an adjusting tool can be passed to an adjusting screw disposed in the lower threaded portion of the bore to adjust the relative positioning of the cutting tool with respect to the surface of the head. Means are also provided whereby the withdrawal of the locking cup releases the cutting tool and a method is disclosed whereby the locking of the cutting tool is made more effective.

PATENTED APR 13 1971
3,574,251
SHEET 1 OF 6
Fig.1.
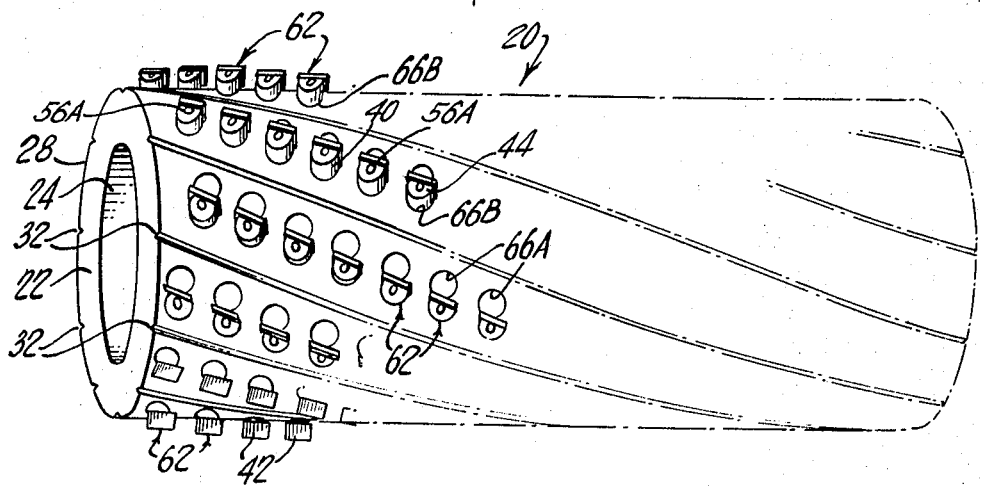
Fig.2.
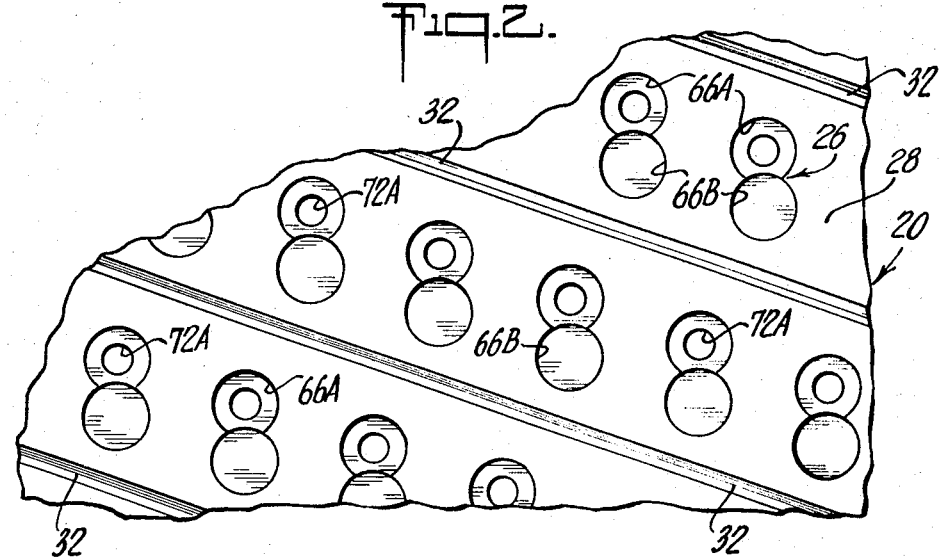
Fig.14.
Fig.6.
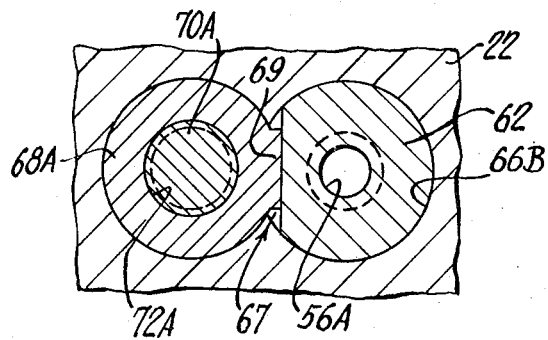
INVENTOR
MARC A. CORTI
BY
Nolte & Nolte
ATTORNEYS

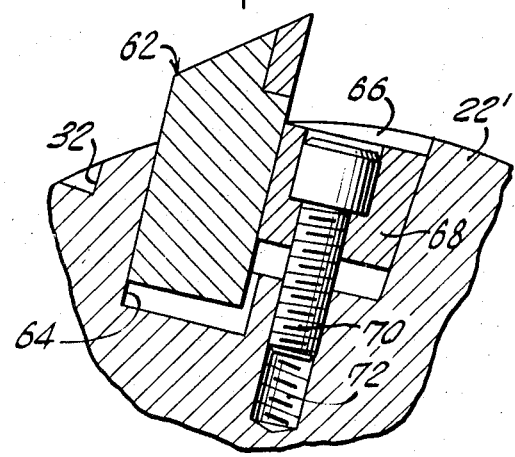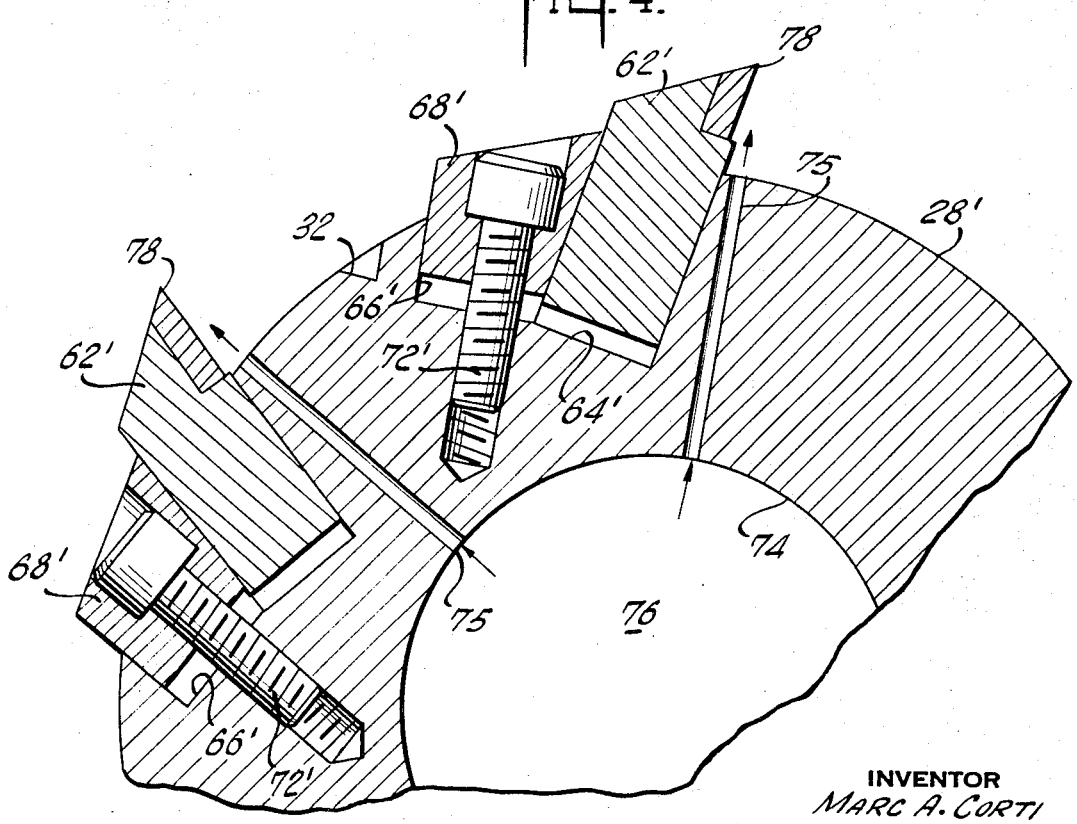

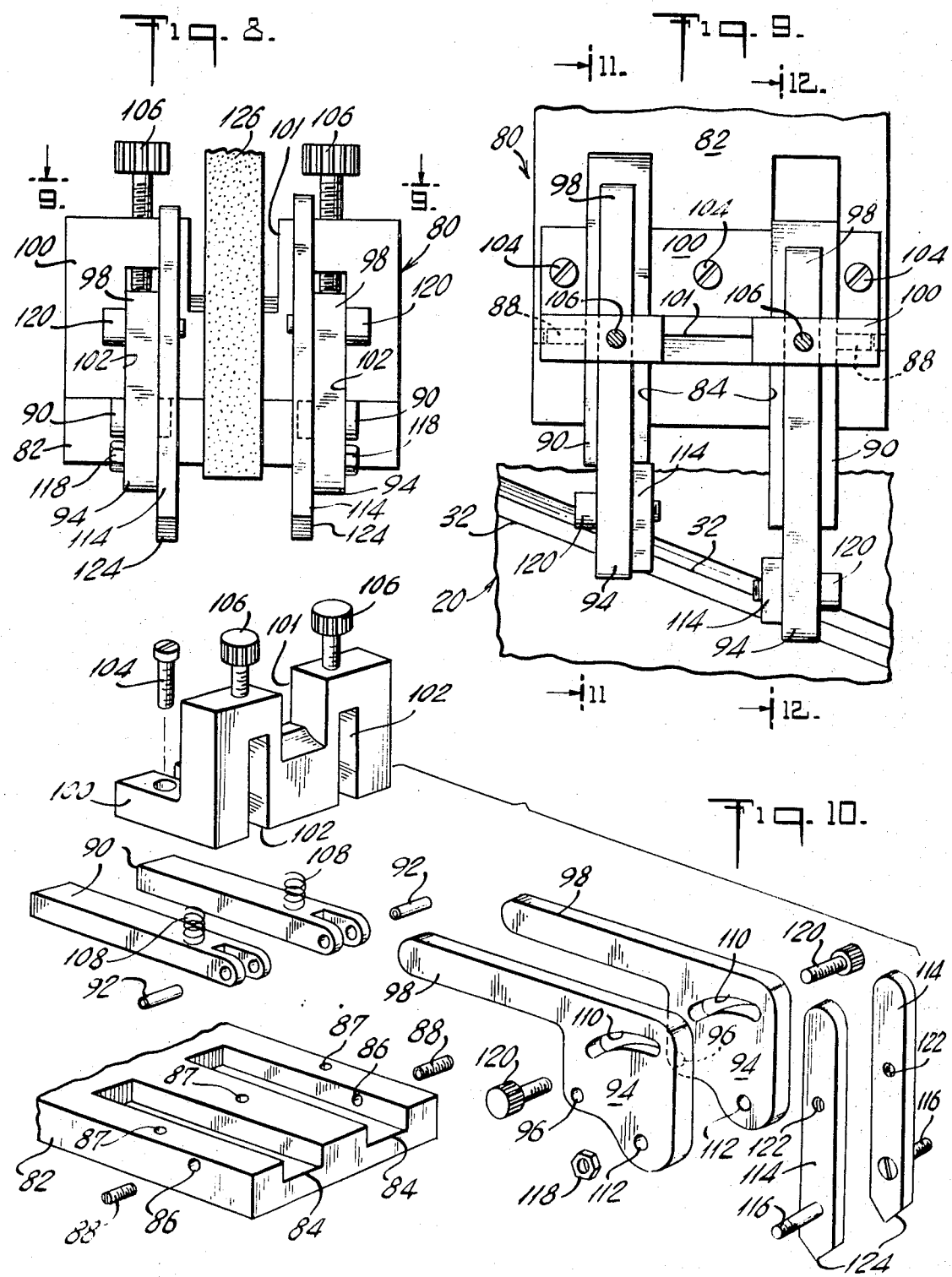

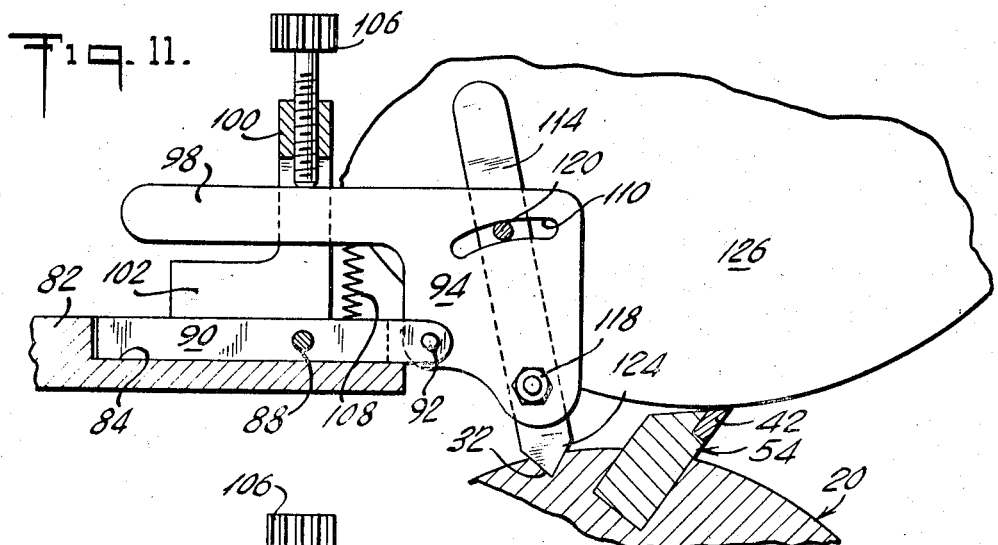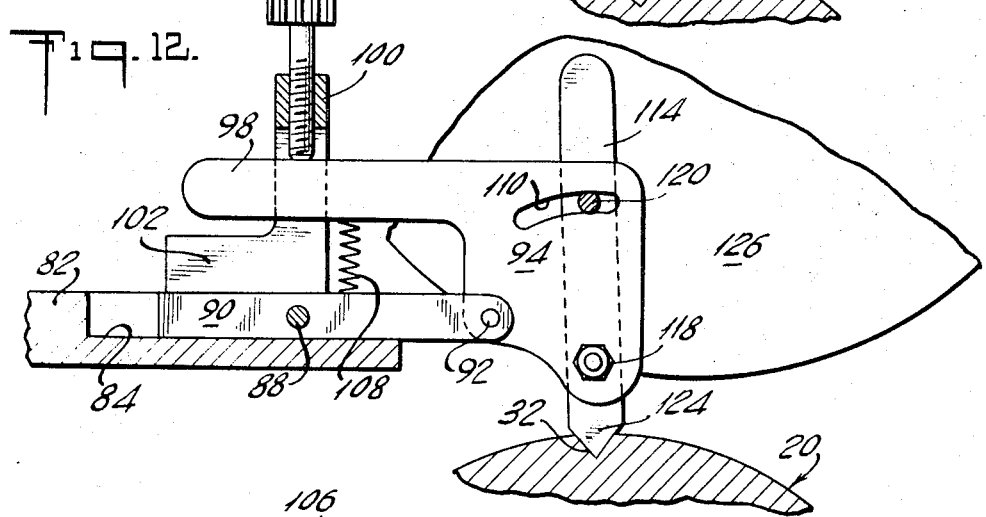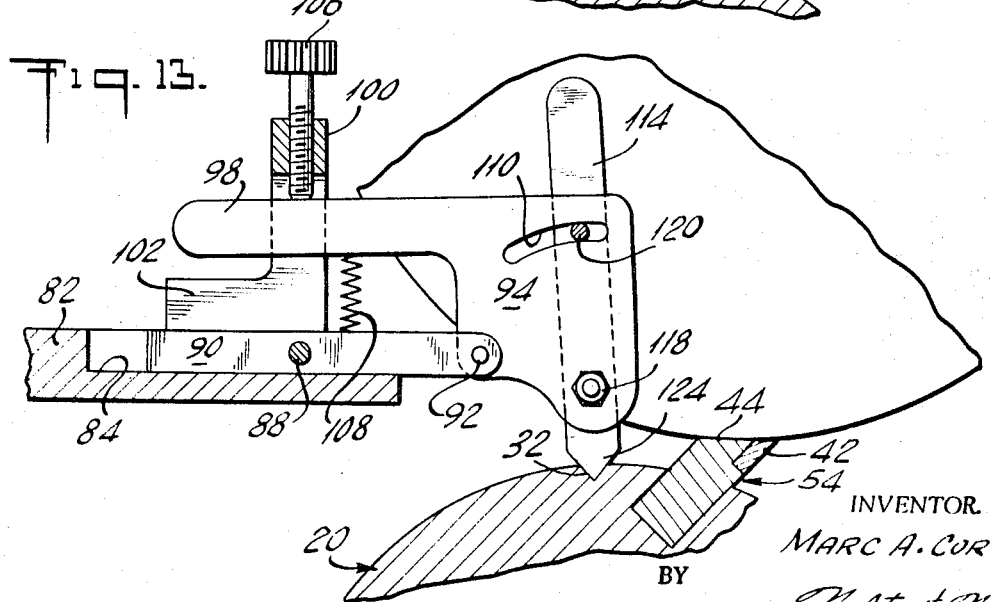

CUTTING TOOL

This application is a continuation-in-part application of my copending application Ser. No. 628,515, filed Feb. 24, 1967 which was a continuation-in-part application of my application Ser. No. 379,530 filed Jul. 1, 1964, now abandoned.

The present invention relates to improvements in that type of cutting tool where a cutter body carries a plurality of cutting tools or bits which have outer cutting edges situated beyond the exterior surface of the cutter body.

This invention also relates to improvements in cutting tool-locking cup combinations which have wedged shape portions wherein these components will automatically align themselves upon insertion even when they are inserted in substantial nonalignment to each other and/or to their desired final position, and which when so aligned will maintain the cutting tool in the desired position.

The invention also relates to improvements in sharpening arrangements for cutters wherein the bits are arranged helically about the transverse rotational axis of the cutter.

With cutters of this type there are several problems which are encountered in practice. The cutter will rotate about a predetermined axis during use of the cutting tool and at this time it is important that the cutting edges all be located at the same distance from the rotary axis of the tool. As a result, as the tool becomes worn, it is necessary to sharpen the cutting edges and in addition it is important to maintain the sharpened cutting edges accurately spaced at the same distance from the axis of rotation of the tool.

Furthermore, the cutting tool and locking cup elements as previously utilized, were designed to communicate with each other to fill a single circular recess. As a result these elements can be inserted with the cutting tool blade being improperly positioned. Therefore, time is required to properly position the cutting edges. Since there are a considerable number of cutting tool combinations involved, this time factor is considerable and this is therefore highly undesirable.

Furthermore, as the cutting tools become worn, the distance between their cutting edges and the axis of the cutter will become smaller, but not to the same extent for all of the cutting edges, so that even if the cutting tools are all ground to the same extent, for example, they will not be accurately spaced at the same distance from the axis of the cutter. It thus becomes necessary to adjust the tools with respect to the cutter body, and here again considerable difficulties are encountered because of the fact that the adjusting structure for the tools must be capable of withstanding the stresses encountered in use of the cutter. In this latter connection, it is of course important to be able to reliably fix the cutting tools to the cutter body so that the tools will not move relative thereto during use of the cutter, and here again serious problems are often encountered in practice with the previously utilized structures.

Furthermore, during the use of a cutter of the above type, particularly when cutting wood, it often happens that chips will cling directly to the cutting edges with the result that the tool cannot provide a smooth surface on the work, and although chip-removing arrangements are already known, so far they have not been able to effectively remove chips which cling to the cutting edges to become situated between these edges and the surface which is being cut.

Accordingly it is an object of the present invention to provide a cutting tool-locking cup combination in which these components can be inserted in substantial nonalignment to each other and/or to their desired final position and yet the desired alignment of the cutting tooth will be automatically achieved and this alignment will be maintained.

Another of the objects of the present invention is to provide a cutter of the above type with a structure which is capable of accurately adjusting the individual cutting bits relative to the cutter body so as to adjust the distance of the cutting tips from the exterior surface of the cutter body.

Another object of the present invention is to provide for a cutter of the above type an adjusting structure which not only is capable of adjusting the distance between the cutting tips and the exterior surface of the body which carries the cutting tools, but which is capable of carrying out this adjustment without removing the cutting tools from the cutter body, so that the structure is extremely convenient to operate.

It is a further object of the present invention to provide in a cutting tool of the above type a structure which is capable of releasably fixing cutting tools to a cutter body in a completely reliable manner which will prevent any movement of the tools relative to the body during use of the cutter and which at the same time will be capable of fixing the tools to the body after the positions of the tools relative to the body have been adjusted.

Yet another object of the present invention is to provide for a cutter of the above type a structure which will reliably remove chips, including particularly those chips which are situated precisely at the cutting edges of the cutting tools.

It is also an object of the present invention to provide a method for grinding cutting tools in such a way that all of the cutting edges will have their locations with respect to the exterior surface of the body which carries the tools precisely determined while at the same time enabling the grinding operations to be conveniently and quickly carried out.

In general, the objects of the present invention include the provision of a structure which is capable of accomplishing all of the above objects while at the same time being made up of simple rugged elements which are inexpensive to manufacture and assemble, which can be maintained conveniently over a long period of time, and which are very reliable in operation.

According to the invention, the cutterhead includes a cutter body which is formed with recesses, each of the recesses being comprised of two cylindrical portions partly communicating at and extending into the body from an exterior surface thereof and which terminate in inner closed ends situated distant from the exterior surface of the cutter body. A plurality of cutting tools or bits have shanks situated in one of these portions and outer cutting tips located beyond the exterior surface of the cutter body. An adjusting means cooperates with the bit shanks for adjusting the latter relative to the cutter body for determining the extent to which the tips of the bits project beyond the exterior surface of the cutter body. Each bit has associated therewith an individual clamping means so that individual bits may be adjusted or replaced without disturbing the remaining bits. In addition, a means is operatively connected to the cutter body for directing streams of fluid from the exterior surface of the cutter body respectively toward the cutting tips so as to remove chips therefrom. Moreover, the exterior surface of the cutter body is formed with helical grooves which extend parallel to the helical positioning of the bits. In accordance with the invention, these grooves are adapted to receive the free ends of guiding fingers which are adjustably connected to a grinding assembly for rotary indexing the cutter body during the sharpening of the helically arranged bits.

The invention is illustrated by way of example in the accompanying drawings which form part of the application and in which:

FIG. 1 is a perspective view of one embodiment of a cutterhead according to the invention;

FIG. 2 is a fragmentary-developed view of the exterior surface of the cutter body illustrating the manner in which recesses and guiding grooves of the body are arranged;

FIG. 3 is a fragmentary transverse sectional view illustrating another embodiment of a structure for fixing a cutting bit to a cutter body;

FIG. 4 is a fragmentary transverse sectional view illustrating structure for removing chips;

FIG. 6 is a sectional view of the invention as applied to FIG. 5 taken along line VI—VI of FIG. 5 and viewed in the direction of the arrow A—A;

FIG. 8 is a front elevation of a structure for guiding a cutter body during grinding of the bits;

FIG. 9 is a partly sectional top plan view taken along the line 9–9 of FIG. 8 in the direction of the arrows;

FIG. 10 is an exploded perspective illustration of the structure of the invention for guiding of the cutter body during grinding of the cutting bits;

FIG. 11 is a partly sectional side view taken along the line 11–11 of FIG. 9 in the direction of the arrows;

FIG. 12 is a partly sectional side view taken along line 12–12 of FIG. 9 in the direction of the arrows;

FIG. 13 shows the structure as illustrated in FIG. 11 but used for grinding a part of the cutting bit different from that which is ground in FIG. 11;

FIG. 14 is a sectional view similar to that of FIG. 6 of the invention according to a second preferred embodiment;

Figure 5:
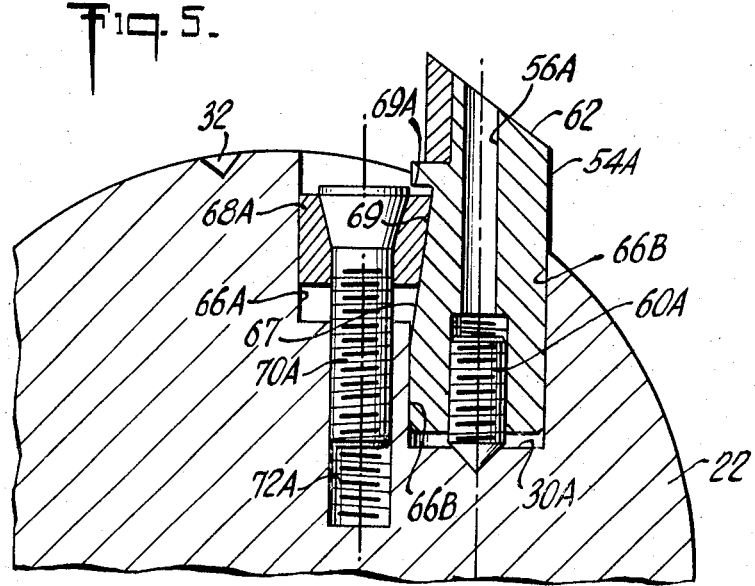
FIG. 5 is a fragmentary transverse sectional view illustrating another locking embodiment of the cutting bit to the cutter body.

Referring now to the drawings, and to FIGS. 1 and 2 in particular, it will be seen that a cutterhead 20 includes a cutter body 22 which in the illustrated example is of a cylindrical configuration. The cylindrical cutter body 22 is axially bored so as to receive an arbor (not shown), for example, and the cutterhead is mounted on the arbor in a manner well known in the art so that when the arbor is rotated the cutterhead will also rotate to perform the cutting operations.

The cutter body 22 is formed with a plurality of recesses 26 each of which is made up of two cylindrical portions which partly communicate at and which extend inwardly from the exterior surface 28 of the cutter body and terminate in inner closed ends which are distant from the exterior surface 28 of the cutter body 22. These two cylindrical portions may be parallel or nonparallel. As is apparent from FIGS. 1 and 2, the recesses 26 are arranged in helical rows and are staggered relative to the recesses in the adjacent row. The exterior surface 28 of the body 22 is formed with elongated helical V-grooves 32 which extend parallel to the rows of recesses 26 for the purpose of guiding a tooth-grinding mechanism (not shown) thereby to achieve even tooth heights during sharpening.

A plurality of cutting tools or bits are respectively received in one of the cylindrical portions of each of the recesses 26, and these cutting tools have cylindrical shanks 40 which carry cutting tips or blades 42. The body 22, as well as the shanks 40, may be made of any suitable metal such as steel, and the cutting tips 42 are made of any known hard cutting material such as tool steel or tungsten carbide and are fixed in any suitable manner, well known in the art, rigidly to the shanks 40.

FIG. 3 illustrates an embodiment of a structure for releasably fixing the automatically aligned cutting bits to the cutter body 22'. In this case, cylindrical recesses 64 partly communicate with cylindrical recesses 66 at the surface of the cutterhead and extend inwardly in the same direction. A bit 62 in the form of a cylinder having an axially planar surface cut therein is introduced into its recess 64. The locking cup 68 which is cylindrical in form and which has a similar planar surface cut axially therein and a wedge-shaped surface cut axially on the opposite surface of the cylinder is introduced into its recess 66. This recess has a wedge portion which is positioned to be juxtaposed to the locking up wedge surface when the planar surfaces of the locking cup and bit are in contact within these recesses. These planar surfaces are preferably serrated. When the locking cup 68 is screwed downwardly, these serrated planar surfaces are forced into tight communication and this construction provides a completely reliable fixing means which prevents any possibility of movement of the bits 62 during operation of the cutter. In order to press the wedge member 68 into the recess 66, the wedge member 68 is formed with a countersunk bore passing therethrough and receiving a screw 70 which is threaded into a threaded bore 72 formed in the body 22', so that in this way the screw 70 can be screwed into the bore 72 for pulling the wedge member 68 into the tapered recess 66 so as to tightly fix the bit 62 into position. Of course, this construction of FIG. 6 is duplicated for all of the cutting bits.

In FIG. 4, the cutter body is also provided with cylindrical recesses 64' for receiving the cutting bits 62'. These recesses partly communicate with cylindrical nonparallel recesses 66' at least at the cutter body surface. The locking means 68' are tapered and when inserted into recesses 66' while the cutting tools are in their respective cylinders 64' the tapered surface contacts the planar portion of the cutting tool shank. This locking means can be urged inwardly toward the interior of the recesses 66' by the screw member 72'. Again it is preferred to have the contacting surfaces of the cutting tool 62' and the locking cup 68' serrated. Thus, the releasable fixing means of FIG. 4 is substantially identical with that of FIG. 3 except that in this case the wedge members 69' engage the side planar surfaces of the bits 62' which surfaces are positioned away from the cutting tips.

FIG. 4 also illustrates a structure which reliably removes chips, particularly from the area in front of the cutting edges 78. As may be seen from FIG. 4, the cutter body has a hollow interior 76 which may be placed in any suitable way in communication with fluid under pressure such as air derived from a compressed-air tank (not shown). A means is provided for directing streams of fluid from the exterior surface 28' of the cutter body respectively toward the edges 78 in engagement with the latter while flowing past the same so as to remove chips therefrom. This latter means takes the form of a plurality of bores 75 which are formed in the cutter body passing through the same from its exterior surface 28' to its interior surface 74 so as to communicate with the hollow interior 76 with which a source of compressed fluid communicates, as mentioned above, The orientation of the bores 75 is such that they are directed toward the cutting edges 78, and therefore streams of fluid which flow through the bores 75 beyond the exterior surface 28' will engage the flow past the cutting edges 78 so as to remove chips therefrom.

FIG. 5 illustrates a further embodiment of a locking structure for releasably fixing the cutting bits 62 to the cutter body 22. The bits 62 in the illustrated embodiment have a bore 56A passing therethrough for permitting a tool to pass therethrough to adjust the screw 60A thereby to adjust the height of the bit 62 relative to the cutter body 22.

In this embodiment the bits 62 are received in round recesses 66B formed in and extending inwardly from the surface of the cutter body 22. The locking cup 68A is disposed also in a round recess 66A which runs parallel with recess 66B and which partly communicates with it at the surface 28 of the cutting head 26. The locking cup member 68A which at one side thereof has an inwardly tapered portion 69 formed thereon cooperates with a juxtaposed reversed tapered portion 67 formed on the shank of each bit 62, When locking cup 68A is forced down by screw 70A being screwed into threaded bore 72A, it forces the tapered surface 69 against the reversed tapered portion 67 thereby providing an extremely tight fit for the bit 62 within the round recess 68B. Of course, this locking structure is similar for all bits 62 of the cutting body.

Once the locking screw 70A is fully tightened, means is available to insure no loosening of the fastening system. By turning the cutting tool adjustment screw 60A in the direction to elevate the cutting tooth, the forces on the locking screw threads will increase as is commonly accomplished with a safety lock washer while the proper height of the cutting tool will remain unchanged.

Figure 7:
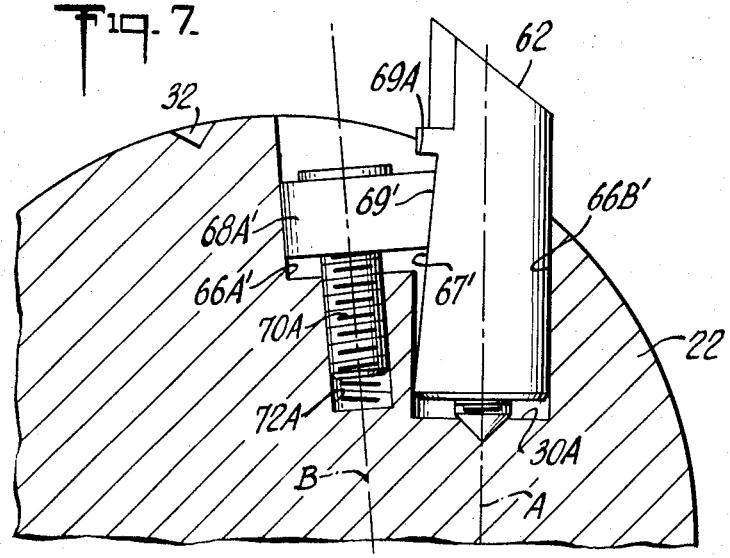
FIG. 7 is a similar view as FIG. 4, showing a still further locking embodiment of the cutting bit to the cutter body.

Cutting tool 62, in FIGS. 5 and 7, has therefrom extending a shoulder 69A. When it is desired to remove the cutting tool 62, the locking cup screw 70A is withdrawn and an extracting element (FIG. 14) is screwed into the locking cup threads until it bottoms in bore 72A. As the extractor is further turned, it forces the locking cup to move outwardly from its recess and this movement results in the locking cup contacting the shoulder 69A and forcing it and therefore the cutting tool to move outwardly from the cutting tool recess.

This is advantageous in that both the locking cup 68A and the cutting tool 62 become firmly imbedded in their respective recesses due to sap and the like, which is present in the wood being cut, seeping into these recesses and there being acted upon by the tremendous heat generated by the cutting tools.

FIG. 7 shows an embodiment which is similar to the embodiment of FIG. 5 in that the recesses 66B' and 66A', are round and they also partly communicate at the surface 28 of the cutter body 22, except that they are not parallel as seen by the converging axes A and B of the respective recesses. Similar parts are identified by similar reference numerals as in FIG. 5, some of them being primed.

In each of the preferred embodiments, the cutting tool and locking cup portions have been described as partly communicating at the surface 28 of the cutterhead 26. This relationship can be better understood when reference is made to FIG. 6. While FIG. 6 is a sectional view of FIG. 5, it fully describes this relationship for all the preferred embodiments.

In FIG. 6, a cylindrical cutting tool recess 66B is shown partly communicating with the cylindrical locking portion recess 72A, establishing a noncircular recess opening.

As can be seen from FIGS. 5 and 6, the cutting tool and locking means occupy cylindrical openings in the cutter body. These cylindrical openings partly communicate for at least a portion of their length and at the cutter body surface 28. In the preferred embodiments, these recess portions combine to establish basically a figure-eight configuration, as shown.

When so inserted, the contact which is established between the juxtaposed planar surfaces prevents the individual rotation of either the cutting tool or locking means. This is not true for existing combinations.

With the utilization of juxtaposed planar surfaces 67, 69, as illustrated in the preferred embodiments, on the tool and locking portions which are to communicate as above stated, it is possible for the cutting tool portion 62 to be positioned so that its cutting tool surface is substantially out of alignment with the desired locked position and yet upon insertion of the locking cup 68A, alignment of the cutting tooth with the desired cutting tooth position will be automatically achieved. This results from the fact that when the cutting tool portions and the locking cup portions of the preferred embodiments are inserted or are being inserted, these portions do not fully fill up the cylindrical portions into which they fit, thereby creating a separation between these surfaces. These portions do not fill up these partly communicating recess openings until the planar surfaces of the cutting tool and locking cup come into planar contact. Therefore, this separation of the planar-shaped surfaces prior to locking provides a tolerance which allows either or both of the wedge-shaped surfaces to be substantially out of alignment with their final, i,e., when the wedged surfaces are locked, alignment. The force components which will be exerted on the nonjuxtaposed wedge-shaped surfaces will force those surfaces to become juxtaposed and thereby establish contact automatically therebetween and since the cutting tool and locking cup fit into partly communicating recesses, it will establish and maintain the alignment of the cutting tooth in the desired position. This position is predetermined and set by the alignment of each cutting tool tooth surface and the helical row of tool portions.

Figure 15:
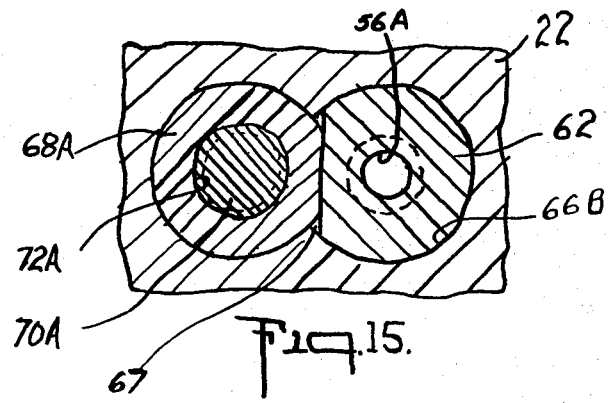
FIG. 15 is a view similar to FIG. 7 showing a further preferred embodiment.

The wedge-shaped surfaces 69 and 67 can be established in the cylindrically shaped components themselves (FIG. 15), or it has been found that these results can also be achieved by utilizing an extension having a wedge-shaped surface and which is fixedly attached to the locking cup itself as is shown in FIG. 6.

This feature eliminates the need for meticulously establishing the proper positioning of these portions to achieve the desired alignment. Since this alignment is automatically achieved, the locking portion screw 70A can be immediately inserted and tightened without first achieving alignment of bore 72A with locking portion bore 75. This substantially reduces the insertion time of the locking cup and cutting tool portions.

Figure 16:
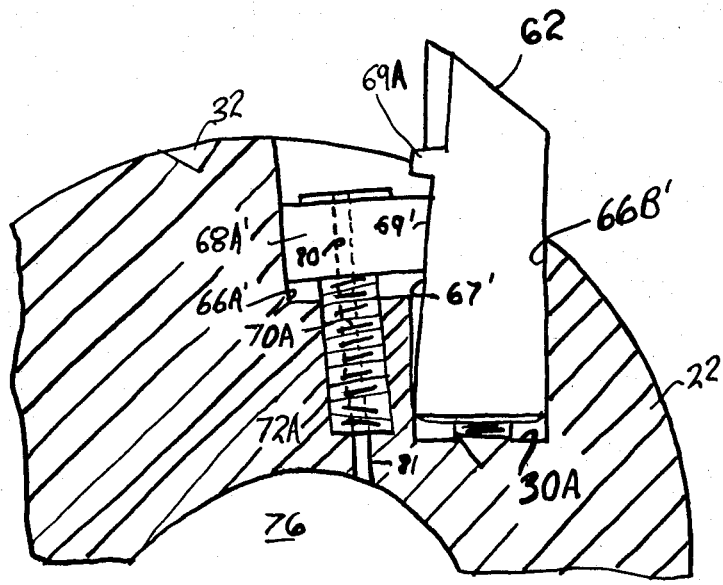
FIG. 16 is a fragmentary transverse sectional view illustrating another locking embodiment of the cutting bit to the cutter body.

By utilizing a cutterhead with an axial central bore 76 as shown in FIG. 16 an advantageous method of achieving chip removal can be effected by utilizing locking screws having bores 80 extending completely axially therethrough which are screwed into their corresponding locking screw bores 72A which themselves communicate with the axial central bore of the cutterhead by means of a bore 81. This results in air being forced from the cutterhead bore through the screw and outwardly from the locking cup past the cutting tooth edge.

The V-grooves 32 referred to above extend parallel to the helical rows of cutting bits which are respectively received in the recesses 26, these grooves serve to receive the free ends 124 of guide fingers 114 of the jig shown in FIGS. 8—10 to guide and rotate the body of the cutter during grinding of the bits after they have been fixedly mounted in body 22. Referring now to FIGS. 8—10, there is illustrated a grinding jig structure which forms part of a grinding assembly, in accordance with the invention. The structure includes a bracket 82 which is adapted to be fixedly mounted on the bed of the grinder. The bracket 82 is formed with a pair of parallel grooves 84 as well as with threaded bores 86 and with threaded bores for receiving setscrews 88 which communicate with the interior of the grooves 84.

Elongated guide members 90 are received in the grooves 84 to be longitudinally movable therein, and the setscrews 88 which are threaded into the bracket 82 can be pressed against the guide members 90 so as to fix the latter in the desired lateral position relative to the bracket 82. The guide members 90 are notched at their outer ends which project forwardly beyond the bracket 82, and also they are transversely bored to receive pivot pins 92 which extend across the notches.

A pair of plates 94 have portions which are formed with the bores 96 received in these notches and the pivot pins 92 extend through the bores 96 so that in this way the plates 94 are pivotally connected to the guide members 90. The plates 94 each have rearwardly extending elongated arms 98.

Located over the bracket 82 is a rigid member 100, which forms part of the supporting structure of the assembly shown in FIGS. 8—10. The member 100 is formed with a pair of notches 102 which form upward extensions of the grooves 84 so that the arms 98 can extend freely through the notches 102, as is apparent particularly from FIGS. 11—13. Screws 104 pass through bores of the support member 100 into the threaded bores 87 of the bracket 82 so that in this way the support member 100 is fixed rigidly with the bracket 82. In addition, the support member 100 is formed with threaded bores which carry the adjustment screws 106 which are in alignment with the notches 102 so as to extend downwardly into the latter to engage the upper edges of the elongated arms 98 of the plates 94, as shown in FIGS. 11—13. Between the screws 106 the support member 100 is formed with a clearance notch 101 through which a rotary grinding wheel 126 may freely pass without interference during the grinding operation.

A pair of compression springs 108 press against the top faces of the guide members 90 and against the lower surfaces of the arms 98 of the plates 94 to urge these arms against the bottom ends of the adjusting screws 106. Because of the pivotal connection of the plates 94 via the pins 92 to the guide members 90 it is possible by turning the screws 106 to adjust the angular positions of the plates 94 relative to the guide members 90. Each plate 94 is formed with an arcuate slot 110 which extends along a circle whose center is in the axis of a bore 112 which passes through the plate 94 at its lower front end portion.

A pair of guide fingers 114 are respectively located beside plates 94 and extend downwardly below the latter as well as transversely across the slots 110. Screw members 116, carried by the fingers 114, respectively pass through the bores 112 and carry nuts 118, respectively, so that in this way the fingers 114 are pivotally carried by the plates 94 for free pivotal movement relative thereto. A pair of locking screw members 120 respectively pass through the slots 110 into threaded engagement with the threaded bores 122 which are formed in the guide fingers 114.

When it is desired to grind all the cutting bits, as would be necessary upon original manufacture or upon dulling through use, or bit replacement, the cutter body is placed adjacent the grinding wheel 126 with the tips 124 of the guiding fingers 114 received in the groove 32 which extends helically parallel to the row of cutting tools which are being ground. As a result, as the grinding wheel is axially translated relative to the cutter body the cooperation of the guide fingers 114 with the grooves 32 will serve to turn the cutter body (which is rotationally supported on centers not shown) so as to accurately and smoothly index each successive cutting bit of a given row to the grinding wheel 126.

The use of a pair of guide finger assemblies is of particular advantage since these assemblies are arranged on opposite sides of the grinding wheel 126, as is apparent from FIG. 8, and thus the guide fingers may be situated at different distances from the bracket 82, so as to accommodate the helical configuration of the groove 32. With this construction it will be noted that even when grinding the end bit of a given row, if one of the fingers 114 is situated beyond the end of the cutter body the other finger will still cooperate with the groove to guide the cutter body during the grinding of the bit.

The fingers 114 are pivotable relative to the plates 94, with the result that the pair of fingers shown in FIGS. 8 and 9 can respectively assume different inclinations. As shown in FIGS. 11 and 12, respectively, the different locations of the portions of the guiding groove which at any instant are respectively engaged by the guide fingers will simply turn the guide fingers to the positions shown in FIGS. 11 and 12 while still providing an accurate guiding of the cutter relative to the grinding wheel 126.

While the structure is shown in FIG. 11 as used for grinding the cutting edge itself, it is of course necessary also to grind the outer end face 44 behind the cutting tip, and the jig setup used for this purpose is shown in FIG. 13.

It is to be noted that it is not at all necessary to situate the grinding grooves 32 between a row of threaded bores 34 and a row of recesses 26, as indicated in FIGS. 2 and 3, as well as FIG. 1. The grooves 32 can be situated midway between the rows of bits or at any distance from the rows of bits which will provide proper grinding and a particular distance between the guiding grooves and the rows of cutting bits will be determined, for example, by the diameter of the body 22 of the cutterhead.

While several specific embodiments of the invention have been shown and described in detail to illustrate the application of the inventive principles, it should be understood that the invention may be embodied otherwise without departing from such principles.

I claim:

1. A cutterhead having a cutter body having an exterior surface, a plurality of recesses extending into said cutter body and respectively arranged along said exterior surface in at least one helical row, each of said recesses comprising a pair of substantially cylindrical recess portions, said recess portions partly communicating with each other at said exterior surface, a plurality of cutting tools having cylindrical shank portions for insertion into one of said recess portions of each of said plurality of recesses, said cutting tools having cutting tips for extending beyond said exterior surface when in inserted position, a plurality of locking means, said locking means having cylindrical shank portions for insertion into the other one of said recess portions of each of said plurality of recesses, a portion of each of said locking means having a tapered surface directed so that the widest part of said shank is towards the outer recess portion when each of said locking means is inserted into its associated recess portion, a portion of each of said cutting tools having a planar surface so that when said locking means and said cutting tools are inserted into their respective recess portions of each of said plurality of recesses, said surfaces of said locking means and the corresponding cutting tool of each of said recesses establishes substantially planar contact therebetween.

2. An arrangement as defined in claim 1, wherein said recess cylindrical portions of each of said recesses have longitudinal axes running other than parallel to each other.

3. An arrangement as defined in claim 1, wherein said cutting tool planar surface is a tapered surface.

4. An arrangement as defined in claim 1, wherein said cylindrical recess portions of each of said recesses are parallel to each other.

5. A cutterhead as claimed in claim 1, wherein said cutting tool recess portion of each of said plurality of recesses terminates in inner closed ends distant from said exterior surface of said cutter body, said tools respectively terminating distant from said cutting tips in inner ends which are adjacent and directed toward said inner ends of said cutting tool recess portions, so that two sets of inner ends, one at said inner end of each of said cutting tool recess portions and one at said inner ends of said tool shanks are provided, and a plurality of setscrews respectively threadedly connected to one of said sets of inner ends and engaging the other of said sets of inner ends, respectively, so that said plurality of setscrews may be turned for respectively adjusting the extent to which said tips of said tools project beyond said exterior surface of said body, and for forcing said cutting tool against said locking means.

6. A cutterhead as claimed in claim 5, wherein each of said cutting tools is axially bored completely through from said outer end to said inner end thereof, each of said axial bores respectively being threaded at said inner ends of said cutting tools, said plurality of setscrews threadedly carried by said shanks at said threaded portions of said bores thereof and respectively projecting beyond said inner ends of said shanks into engagement with said inner closed ends of said cutting tool cylindrical portions, said setscrews respectively having ends which are adapted to be engaged by an adjusting tool, which are directed away from said inner closed ends of said cutting tool recess portions and which are accessible through said axial bores of said tools from said outer ends of said shanks, whereby said setscrews may be turned from the exterior of said cutter body while said cutting tools are situated in said cutting tool cylindrical recess portions thereof.

7. A cutterhead as claimed in claim 1, wherein means are carried by said body for directing streams of fluid from said exterior surface of said body respectively toward said tips of said cutting tools for removing chips therefrom.

8. A cutterhead as claimed in claim 7, having a hollow interior portion wherein said fluid-directing means comprises a plurality of bores passing through said cutter body interior to the exterior surface thereof and respectively directed toward said tips of said cutting tools so that a fluid under pressure in the hollow interior of said body will flow through said bores thereof beyond the exterior surface of said body and past and in engagement with said tips of said tools for removing chips therefrom.

9. A cutterhead as defined in claim 1, wherein said locking means comprises a locking cup and locking screw means passing through said cup and adapted to engage said cutter body.

10. A cutterhead as defined in claim 1, wherein said body is formed with an elongated groove in said exterior surface directed substantially parallel to said row of tools for receiving a guiding finger of a grinding assembly to guide said body with respect to said grinding assembly during grinding of said tools.

11. A cutterhead as claimed in claim 10, wherein said cutting tools are arranged along said exterior surface in a plurality of helical rows and wherein said grooves are elongated helical grooves which are substantially parallel to said rows of tools.

12. A cutterhead as claimed in claim 11, wherein said grooves are V-shaped for receiving a V-shaped end of said guide finger of said grinding assembly.

13. A cutterhead as defined in claim 1, wherein each of said corresponding locking means further comprises means for withdrawing said cutting tool.

14. A cutterhead as defined in claim 13, wherein each of said cutting tools further comprises a shoulder portion extending therefrom so that when said locking means is withdrawn by extraction means or the like, said locking means abuts against said shoulder and forces said cutting tool out of its recess.

15. A cutterhead as claimed in claim 9, having a hollow interior portion, having means for directing streams of fluid from said hollow interior portion toward said cutting tool tips, said fluid-directing means comprising said locking screws having axial bores passing therethrough and said cutter body means for engaging said locking screw having threaded bores communicating with said hollow interior portion.